No. 760,424. PATENTED MAY 24, 1904.
C. E. CHURCHILL.
PIPE COUPLING.
APPLICATION FILED MAY 20, 1903.
NO MODEL.

Witnesses
T. L. Meacham
E. L. Corbett.

Inventor
Clyde Earnest Churchill,
by Edson Bros.
Attorneys

No. 760,424. Patented May 24, 1904.

UNITED STATES PATENT OFFICE.

CLYDE EARNEST CHURCHILL, OF SODUS TOWNSHIP, BERRIEN COUNTY, MICHIGAN, ASSIGNOR OF ONE-HALF TO EDWARD JEWELL, OF EAU CLAIRE, MICHIGAN, AND ARA WELDON, OF BENTON HARBOR, MICHIGAN.

PIPE-COUPLING.

SPECIFICATION forming part of Letters Patent No. 760,424, dated May 24, 1904.

Application filed May 20, 1903. Serial No. 158,022. (No model.)

*To all whom it may concern:*

Be it known that I, CLYDE EARNEST CHURCHILL, a citizen of the United States, residing in Sodus township, in the county of Berrien and State of Michigan, have invented certain new and useful Improvements in Pipe-Couplings; and I do hereby declare the following to be a full, clear, and exact description of the invention, such as will enable others skilled in the art to which it appertains to make and use the same.

My invention relates to pipe-couplings, more especially to those which are adapted to connect rubber or elastic hose.

It has for its object to provide an air-tight coupling which can be readily adjusted and disconnected, thus saving time in connecting up several sections of hose. My coupling is at the same time simple, efficient, and cheap of manufacture.

Figure 1:
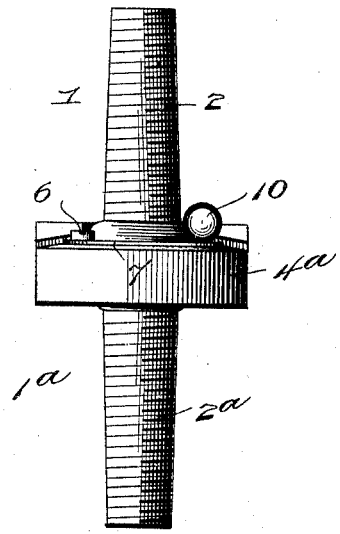
Figure 2:
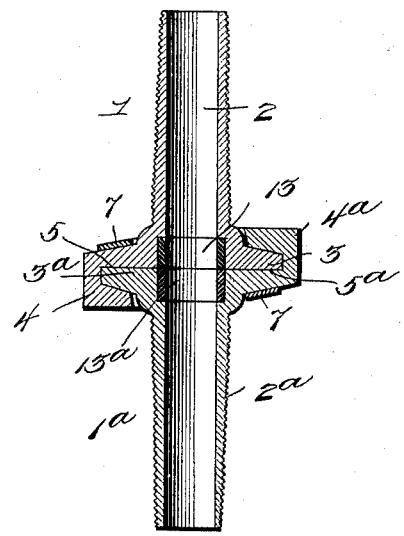
Figure 3:
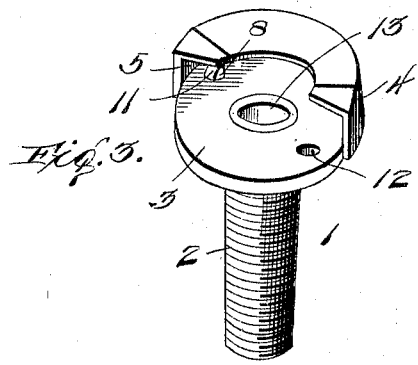
Figure 4:
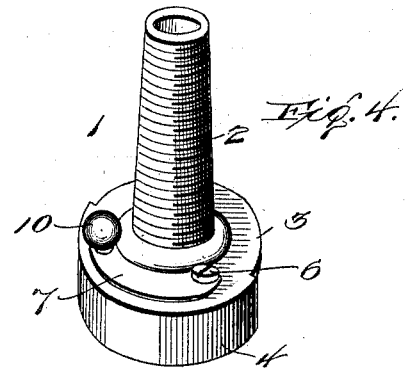
Figure 5:
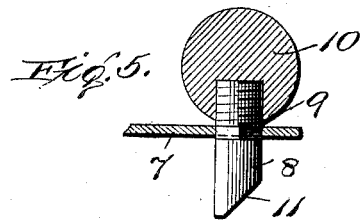

In the accompanying drawings, illustrating the preferred embodiment of my invention, Figure 1 is a side view of my coupling. Fig. 2 is a longitudinal sectional view thereof. Fig. 3 is a perspective view of one member, showing more particularly the gasket and the engaging end of the locking-pin or plunger and the notch or niche to be engaged by the corresponding pin carried by the other member. Fig. 4 is a perspective view of one of the members, showing more particularly the flat spring carrying the locking-pin and the knob for operating said pin. Fig. 5 is an enlarged detailed view of the locking pin or catch, showing its engagement with the flat spring and its operating-knob.

Referring more particularly to the drawings, 1 1ª are the members of the coupling, made of brass or other suitable material, which are substantially alike in structure, having, preferably, screw-threaded tubular extensions 2 2ª for insertion into the hose, flat faces 3 3ª, carrying, preferably, L-shaped semicircular flanges 4 4ª, forming grooves or slots 5 5ª, each adapted to receive the free edge of the face of the other member. On the outer surface of the face of each member and below that portion of said face carrying the flange is secured at one end, preferably by a screw 6, the flat spring 7, carrying at its other end a locking-pin or plunger 8, having a square-shouldered portion 9 to engage a corresponding square aperture in the spring. Above said square shoulder the end of said locking-pin is preferably screw-threaded to engage the knob 10. Below said square shoulder the pin is rounded, and its extremity is beveled at 11. Said pin works in an aperture in the face of the member, which it should fit snugly to prevent leakage. The beveled or ratchet portion 11 extends through and above the inner surface below the flange carried by the face of the member and is adapted to normally stand with its beveled or ratchet surface facing the free edge of the face. To prevent leakage, I provide a socket instead of an aperture in the face for the screw 6. On the inner surface of the free half of each face is provided a notch or niche 12, so placed that when the members are connected the beveled or ratchet portion of the locking-pin or plunger of the opposite member will engage said notch or niche, thereby locking the same against separation until the plungers are withdrawn by operating the knobs 11. The gaskets 13 13ª, set in the faces, are of rubber or similar elastic material and normally stand a little above the surface to make the contact tight.

It is to be understood that I do not limit myself to details of construction herein described, as they may be changed at will and the spirit of my invention remain intact and protected.

Having thus described my invention, what I claim as new, and desire to secure by Letters Patent, is—

1. A pipe or hose coupling comprising two members, each member having a transverse coupling-face provided with a retaining-flange, a plunger or locking-pin arranged beneath said flange, a spring on the exterior surface of said member and having a square opening therethrough, said pin having a ratchet-surface at one end, a square-shouldered portion engaging the square opening in said spring whereby said pin is held in position so that its beveled surface faces the entrance to said flange and a knob for operating said pin, said pin adapted to engage a notch or niche in the other member.

2. A pipe or hose coupling comprising two members, each member having a transverse coupling-face provided with a retaining-flange, a plunger or locking-pin, a flat spring on the exterior surface of said member, a knob for operating the same, said plunger or locking-pin, adapted to engage a notch or niche in the face of the other member, having screw connection with said knob and a beveled ratchet-surface.

3. A coupling of the character described, comprising two similarly-constructed interlocking members, each having a transverse coupling-face carrying a semicircular L-shaped flange, each of said members having a plunger or locking-pin, having a beveled surface on one end, passing through its coupling-face below the L-shaped flange and having a square-shouldered portion engaging a flat spring secured to the exterior surface of the member, whereby said plunger is held in position with its beveled portion facing the entrance to said flange, a knob having screw-threaded connection with said plunger for operating said plunger, each member having a tubular extension for connection with a pipe or hose, and a gasket set in its face and projecting therefrom.

In testimony whereof I affix my signature in presence of two witnesses.

CLYDE EARNEST CHURCHILL.

Witnesses:
E. E. JARVIS,
P. BROOKS.